(12) United States Patent
Faubert et al.

(10) Patent No.: US 9,274,601 B2
(45) Date of Patent: Mar. 1, 2016

(54) SYSTEM AND METHOD FOR GENERATING A FEEDBACK SIGNAL IN RESPONSE TO AN INPUT SIGNAL PROVIDED TO AN ELECTRONIC DEVICE

(75) Inventors: Perry Allan Faubert, Kitchener (CA); Robert James Lowles, Waterloo (CA); Edward Hui, Waterloo (CA)

(73) Assignee: BlackBerry Limited, Waterloo (CA)

( * ) Notice: Subject to any disclaimer, the term of this patent is extended or adjusted under 35 U.S.C. 154(b) by 2442 days.

(21) Appl. No.: 12/108,733

(22) Filed: Apr. 24, 2008

(65) Prior Publication Data
US 2009/0267920 A1  Oct. 29, 2009

(51) Int. Cl.
G06F 3/01 (2006.01)
H04M 1/02 (2006.01)
H04M 1/23 (2006.01)

(52) U.S. Cl.
CPC .............. *G06F 3/016* (2013.01); *H04M 1/0266* (2013.01); *H04M 1/23* (2013.01); *H04M 2250/22* (2013.01)

(58) Field of Classification Search
CPC ....... G06F 3/016; H04M 1/0266; H04M 1/23; H04M 2250/22
USPC ....................... 345/173, 174, 177; 178/18.01, 178/18.04–18.07; 463/37
See application file for complete search history.

(56) References Cited

U.S. PATENT DOCUMENTS

| | | | |
|---|---|---|---|
| 4,633,121 A * | 12/1986 | Ogawa et al. ................. 310/332 |
| 5,734,373 A | 3/1998 | Rosenberg et al. | |
| 6,356,259 B1 * | 3/2002 | Maeda et al. .................. 345/173 |
| 6,424,333 B1 | 7/2002 | Tremblay et al. | |
| 6,505,266 B1 | 1/2003 | Gu | |
| 6,520,834 B1 * | 2/2003 | Marshall ................. B24B 37/04 451/10 |
| 6,826,607 B1 * | 11/2004 | Gelvin ................ B60R 25/1004 340/539.19 |
| 7,017,421 B2 * | 3/2006 | Kehlenbach ...................... 73/800 |
| 7,567,232 B2 * | 7/2009 | Rosenberg ..................... 345/156 |
| 2003/0076298 A1 | 4/2003 | Rosenberg | |
| 2003/0222862 A1 * | 12/2003 | Takeuchi et al. .............. 345/204 |
| 2004/0124741 A1 * | 7/2004 | Morrison et al. ............. 310/314 |
| 2005/0030292 A1 * | 2/2005 | Diederiks ...................... 345/173 |

(Continued)

FOREIGN PATENT DOCUMENTS

CN  1223742 A  7/1999
DE  10214984 A1  10/2003

(Continued)

OTHER PUBLICATIONS

Korean Office Action dated Dec. 8, 2010, issued from the corresponding Korean patent application.

(Continued)

*Primary Examiner* — Lun-Yi Lao
*Assistant Examiner* — Kelly B Hegarty
(74) *Attorney, Agent, or Firm* — Geoffrey deKleine; Borden Ladner Gervais LLP

(57) ABSTRACT

The disclosure relates to a system for providing feedback signals to input signals provided to an electronic device is provided. The system comprises: a display; an input device; an input module to detect activation of the input device; and a input module to generate a feedback signal for the electronic device based on signals from the input module. In system, the input device is a transducer. The transducer may be a piezoelectric element and the input module may cause the transducer to vibrate upon receiving an activation signal from the input module.

22 Claims, 12 Drawing Sheets

(56) References Cited

U.S. PATENT DOCUMENTS

| | | | |
|---|---|---|---|
| 2005/0054390 A1 | 3/2005 | Tuovinen | |
| 2005/0057528 A1* | 3/2005 | Kleen | 345/173 |
| 2005/0146076 A1* | 7/2005 | Alexander | D03D 1/0088 264/257 |
| 2005/0192727 A1* | 9/2005 | Shostak et al. | 701/37 |
| 2006/0022952 A1 | 2/2006 | Ryynanen | |
| 2006/0052143 A9* | 3/2006 | Tuovinen | 379/433.07 |
| 2006/0226298 A1* | 10/2006 | Pierson | 246/1 R |
| 2008/0060856 A1 | 3/2008 | Shahoian et al. | |
| 2008/0117187 A1* | 5/2008 | Tsumura | 345/177 |
| 2008/0297340 A1* | 12/2008 | Popa | B25J 13/08 340/539.1 |
| 2009/0072662 A1* | 3/2009 | Sadler et al. | 310/319 |

FOREIGN PATENT DOCUMENTS

| | | |
|---|---|---|
| EP | 1283538 A2 | 2/2003 |
| KR | 2006-0041881 A | 5/2006 |

OTHER PUBLICATIONS

Triet Le, Jifeng Han, Annette Von Jouanne, Karti Mayaram and Terri S. Fiez. Piezoelectric Power Generation Interface Circuits. IEEE 2003 Custom Integrated Circuits Conference. pp. 489-492.

E. Koray Akdogan, Mehdi Allahverdi and Ahmad Safari. Piezoelectric Composites for Sensor and Actuator Applications. IEEE Transactions on Ultrasonics, Ferroelectrics, and Frequency Control. vol. 52, No. 5 (May 2005): 746-775.

Knight, Helen. Good vibrations: energy harvesting circuit could power electronic devices using human body movement. The Engineer. Sep. 27, 2002.

Paradiso, Joseph A. and Mark Feldmeier. A compact, wireless, self-powered pushbutton controller. Ubiquitous computing international conference, Sep. 30-Oct. 2, 2001, in Atlanta, Georgia, U.S.A.

Tadduni, Joseph P., Yiming Liu and Heath F. Hofmann. Piezoelectric energy harvesting using elements of coupled mode theory. Dept. of Electrical Engineering, Penn State Univ. Annual Research Journal, vol. II. (2004): 60-72.

Examiner's Report dated Sep. 6, 2013, issued in respect of corresponding Canadian Patent Application No. 2,663,338.

Office Action dated Dec. 24, 2012, issued in respect of corresponding Chinese Patent Application No. 200910141993.3.

Rejection Decision dated Mar. 4, 2014, issued in respect of corresponding Chinese Patent Application No. 200910141993.3 (No English translation available).

Office Action dated Aug. 20, 2013, issued in respect of corresponding Chinese Patent Application No. 200910141993.3.

* cited by examiner

SYSTEM AND METHOD FOR GENERATING A FEEDBACK SIGNAL IN RESPONSE TO AN INPUT SIGNAL PROVIDED TO AN ELECTRONIC DEVICE

FIELD OF DISCLOSURE

The disclosure herein describes a system and method for providing a feedback signal for an input signal provided to an electronic device. In particular, the disclosure relates to utilizing a transducer to generating the signal.

BACKGROUND

Current wireless handheld mobile communication devices perform a variety of functions to enable mobile users to stay current with information and communications, such as e-mail, corporate data and organizer information while they are away from their desks.

Current handheld devices optimally are lightweight, compact and have a battery life extending over several hours. Battery life is preferred to be as long a possible. A display, its backlight and a communication module typically are significant sources of power drains on a power source (e.g. batteries) of current devices. Some displays incorporate touch sensitive regions allowing a user to provide an input to the device through the screen. However, such systems do not provide tactile feedback to the user indicative of an activation of such touch sensitive regions.

There is a need for a system and method which addresses deficiencies in the prior art relating generally to input systems for such devices.

BRIEF DESCRIPTION OF THE DRAWINGS

The disclosure and related embodiments will now be described, by way of example only, with reference to the accompanying drawings, in which.

DETAILED DESCRIPTION OF AN EMBODIMENT

Figure 1:
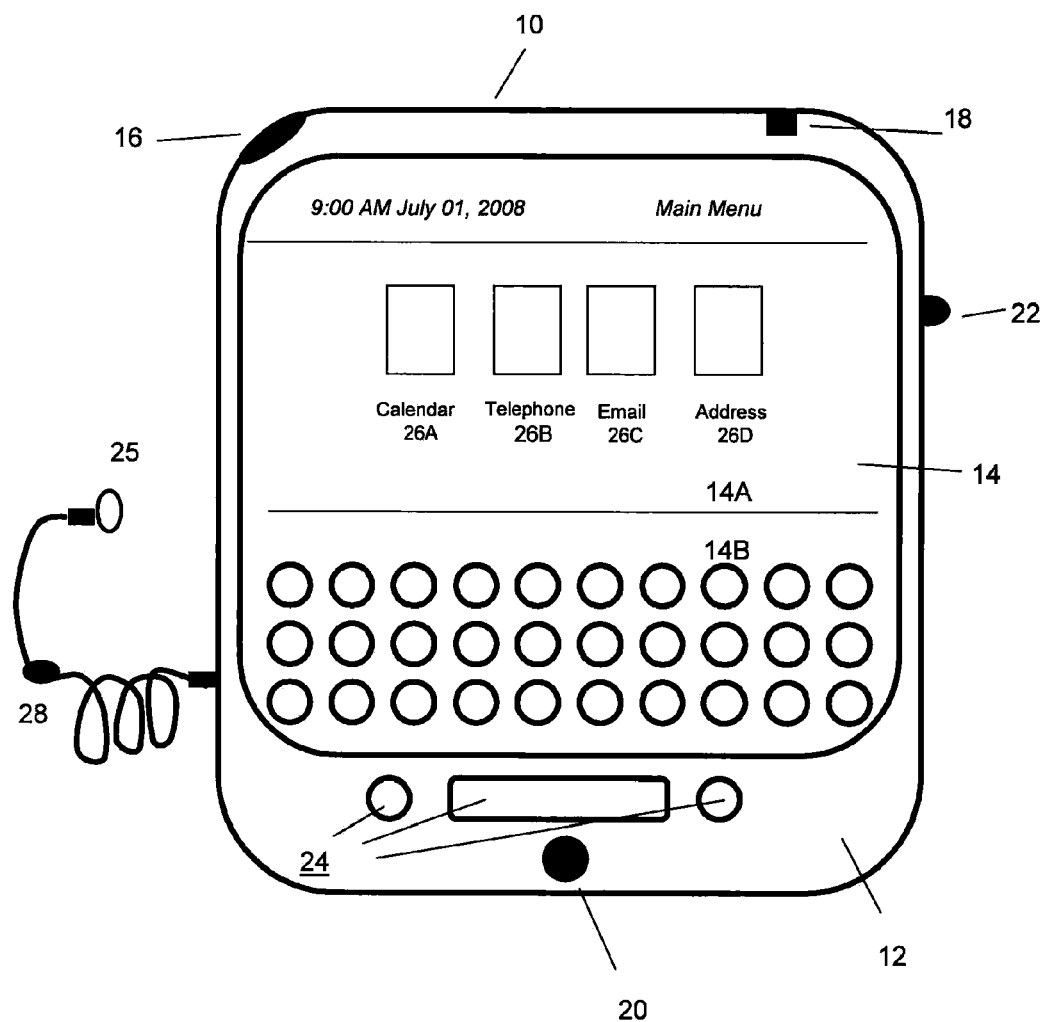
FIG. 1 is a schematic representation of an electronic device having a display, an input device and an input module in accordance with an embodiment.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect of an embodiment, a system for providing feedback signals to input signals provided to an electronic device is provided. The system comprises: an input device; and an input module coupled to the input device, the input module configured to detect a pressure being applied to the input device and to generate a feedback signal for the electronic device based on signals from the input device. In system, the input device is a transducer.

In the system, the input device may be a piezoelectric element and the input module may cause the transducer to vibrate upon receiving an activation signal from the input module.

The system may further comprise a display and a cover for the display. Further the input device may be embedded in a substrate above the display. It may further be placed beneath the cover.

In the system, the input device may be a piezoelectric fibre.

In the system, the input device may further comprises electrodes associated with the piezoelectric element, where the electrodes comprise indium titanium oxide.

In the system, a first set of electrodes may be associated with a first region along the input device and a second set of electrodes may be associated with a second region along the input device.

In the system, the input module may analyze the activation signal to determine if the applied force was applied at either of first or second region and then selectively may cause the input device to vibrate around either the first or second region depending on where the force was applied.

In the system, the input device may be set to vibrate with a force of less than 2 Newtons by the input module upon receiving the activation signal.

In the system, the input device may be set to vibrate with a frequency of between 100 Hz and 300 Hz upon receiving the activation signal.

In the system, the input module may comprise transistors and a pulse width modulator circuit to drive the transistors to selectively activate the input device.

In the system, the input module may provide a voltage generated by the input device to an energy storage circuit. The energy storage circuit may provide a voltage for the input module. In the system, the energy storage circuit may include a capacitor.

In the system, the input module may further comprise an energy recovery circuit to rectify the voltage for the energy storage circuit.

In the system, the input module may selectively apply a first voltage signal to the input device to have it operate as a sensor and a second voltage signal to the input device to have it operate as an actuator.

In the system, the pulse width modulator circuit may generate signals to selectively cause the input module to generate the first and said second voltage signals.

In the system, the input device may be embedded in a substrate in the display.

In the system, the input device may be located between keys in the display.

In the system, the input device, when provided as a piezoelectric fibre, may be arranged in a grid above the display.

In the system, the fibre may be located in ridges on the cover around keys in the display.

In a third aspect, an electronic device such as a wireless communication device, is provided. The device has a display and an input device. The device also has an input module coupled to the input device. The input module is configured to detect a force being applied to the input device. The input module is further configured to generate a feedback signal to the input device based upon the detected applied force as an activation signal. The input device is embedded in a substrate disposed on the display.

In the device, the input device may be a piezoelectric element.

In other aspects, various sets and subsets of the above noted aspects are provided.

Briefly, a feature of an embodiment provides a system where a feedback signal is provided for an input device in an electronic device. The feedback signal may be a motion or movement, but it may also be a visual or audible signal. A transducer, associated circuits and software are provided to monitor for activation of the input device and to provide a feedback signal for the input device. An additional feature harvests energy from the transducer, which is used to provide power for the device.

First, a description of elements in an embodiment in an electronic device are provided, followed by details on specific features of embodiments.

Referring to FIG. 1, an electronic device for receiving electronic communications in accordance with an embodiment of the present disclosure is indicated generally at 10. In the present embodiment, electronic device 10 is based on a computing platform having exemplary functionality of an enhanced personal digital assistant such as cellphone, e-mail, photographic and media playing features. It is, however, to be understood that electronic device 10 can be based on construction design and functionality of other electronic devices, such as smart telephones, desktop computers pagers or laptops having telephony equipment. In a present embodiment, electronic device 10 includes a housing 12, a display 14 (which may be a liquid crystal display or LCD), speaker 16, a light emitting diode (LED) indicator 18, a trackball 20, a trackwheel (not shown), an ESC ("escape") key 22, keys 24, a telephone headset comprised of an ear bud 25 and a microphone 28. Trackball 20 and ESC key 22 can be inwardly depressed as a means to provide additional input signals to device 10. There may be a transparent or tinted cover or lens (not shown) that covers display 14. The term "lens" is used in the context that it may or may not provide optical magnification to one or more areas covering display 14.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit switched phone calls. Ear bud 25 can be used to listen to phone calls and other sound messages and microphone 28 can be used to speak into and input sound messages to device 10.

Display 14 is segmented into two sections, display 14A and display 14B. In display 14A, text and graphical visual output from various applications operating on device are provided, such as outputs from email, telephone, calendar and address book applications. A graphical user interface (GUI) providing an interface to allow entries of commands to activate these applications is provided on display 14A through a series of icons 26. Shown are calendar icon 26A, telephone icon 26B, email icon 26C and address book icon 26D. Display 14B can also generate visual outputs, but it is further configured to provide a set of "keys" (or input areas). The additional set of "keys" in display 14B are diagrammatically represented in FIG. 1 as circles. A value for each key in display 14B may be silk screened on the surface of display 14B, may have a separate key cap affixed thereto or may be generated by display 14B. As such, display 14B can be used to present a virtual key layout on device 10.

Keys 24 provide one or more distinct, fixed input keys for device 10. Typically, they may include at least part of keys in an alphanumeric character set. Keys 24 and keys in display 14B provide input devices with other input devices in device 10, such as trackball 20, and ESC key 22.

Figure 2:
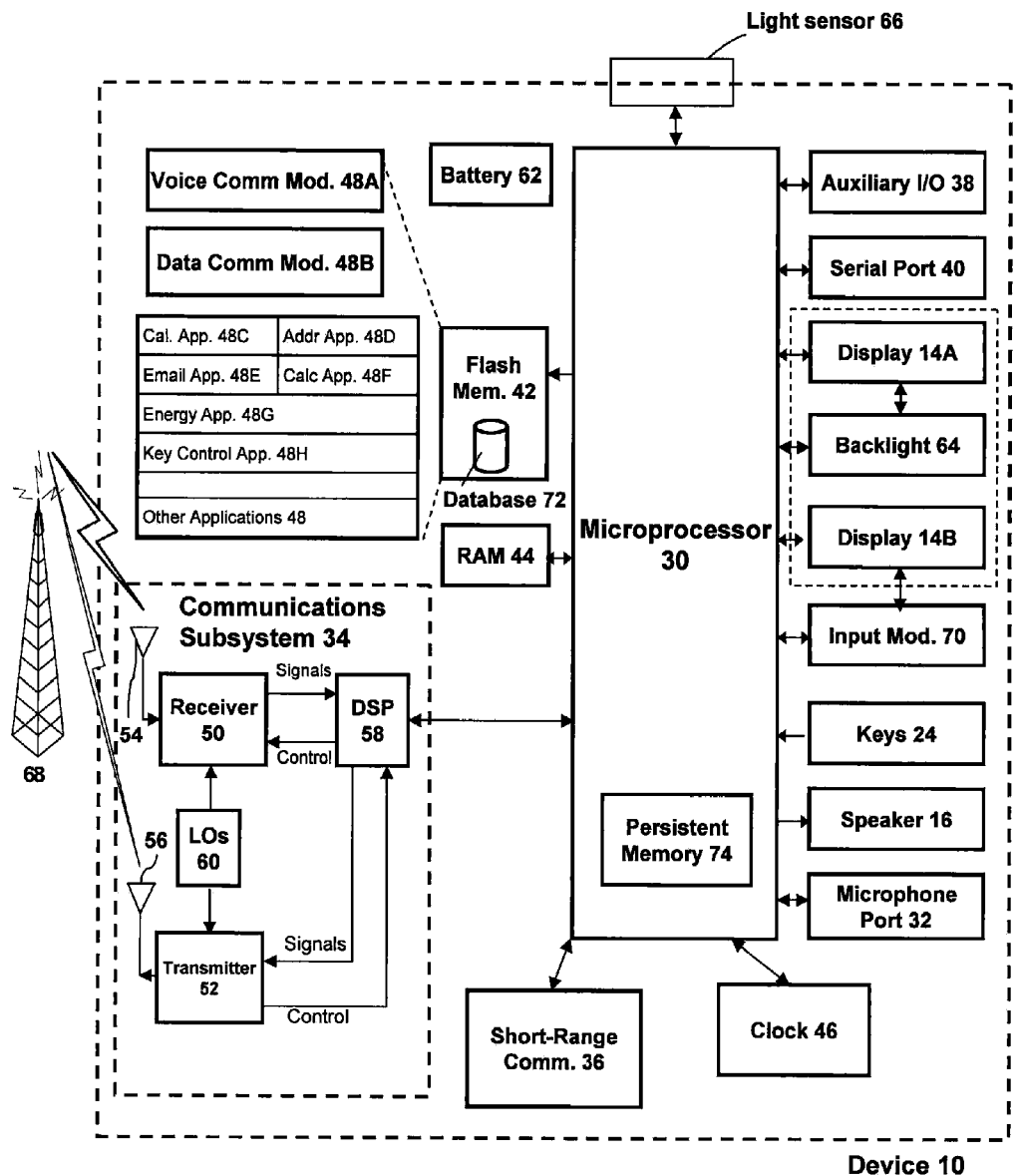
FIG. 2 is a block diagram of internal components of the device of FIG. 1 including the display, the input device and the input module.

Referring to FIG. 2, functional elements of device 10 are provided. The functional elements are generally electronic or electro-mechanical devices mounted within a housing or casing. Many devices are also mounted on an internal printed circuit board (PCB). In particular, microprocessor 30 is provided to control and receive almost all data, transmissions, inputs and outputs related to device 10. Microprocessor 30 is shown schematically as coupled to keys 24, display 14A and 14B, and other internal devices. Microprocessor 30 controls the operation of display 14, as well as the overall operation of device 10, in response to actuation of keys 24 and keys on display 14B. Exemplary microprocessors for microprocessor 30 include microprocessors in the Data 950 (trade-mark) series, the 6200 series and the PXA900 series, all available at one time from Intel Corporation.

In addition to microprocessor 30, other internal devices of device 10 include: a communication subsystem 34; a short-range communication subsystem 36; other input/output devices including a set of auxiliary I/O devices through port 38, a serial port 40, a speaker 16 and a microphone port 32 for microphone 28; and memory devices including a flash memory 42 (which provides persistent storage of data) and random access memory (RAM) 44; persistent memory 74; clock 46 and other device subsystems (not shown). Persistent memory 74 may be a separate memory system to flash memory 42 and may be incorporated into a component in device 10, such as in microprocessor 30. Additionally or alternatively, memory 74 may be removable from device 10 (e.g. such as a SD memory card), whereas flash memory 42 may be permanently connected to device 10. Device 10 is preferably a two-way radio frequency (RF) communication device having voice and data communication capabilities. In addition, device 10 preferably has the capability to communicate with other computer systems via the Internet.

Operating system software executed by microprocessor 30 is preferably stored in a computer readable medium, such as flash memory 42, but may be stored in other types of memory devices (not shown), such as read only memory (ROM) or similar storage element. In addition, system software, specific device applications, or parts thereof, may be temporarily loaded into a volatile storage medium, such as RAM 44. Communication signals received by the mobile device may also be stored to RAM 44.

Microprocessor 30, in addition to its operating system functions, enables execution of software applications on device 10. A set of software applications 48 that control basic device operations, such as voice communication module 48A and data communication module 48B, may be installed on device 10 during manufacture or downloaded thereafter.

Communication functions, including data and voice communications, are performed through communication subsystem 34 and short-range communication subsystem 36. Collectively, subsystem 34 and subsystem 36 provide a signal-level interface for all communication technologies processed by device 10. Various other applications 48 provide the operational controls to further process and log the communications. Communication subsystem 34 includes receiver 50, transmitter 52 and one or more antennas, illustrated as receive antenna 54 and transmit antenna 56. In addition, communication subsystem 34 also includes processing module, such as digital signal processor (DSP) 58 and local oscillators (LOs) 60. The specific design and implementation of communication subsystem 34 is dependent upon the communication network in which device 10 is intended to operate. For example, communication subsystem 34 of device 10 may be designed to work with one or more of a Mobitex (trade-mark) Radio Network ("Mobitex") and the DataTAC (trade-mark) Radio Network ("DataTAC"). Voice-centric technologies for cellular device 10 include Personal Communication Systems (PCS) networks like Global System for Mobile Communications (GSM) and Time Division Multiple Access (TDMA) systems. Certain networks provide multiple systems. For example, dual-mode wireless networks include Code Division Multiple Access (CDMA) networks, General Packet Radio Service (GPRS) networks, and so-called third-generation (3G) networks, such as Enhanced Data rates for Global Evolution (EDGE) and Universal Mobile Telecommunications Systems (UMTS). Other network communication technologies that may be employed include, for example, Ultra Mobile Broadband (UMB), Evolution-Data Optimized (EV-DO), and High Speed Packet Access (HSPA), etc.

In addition to processing communication signals, DSP 58 provides control of receiver 50 and transmitter 52. For example, gains applied to communication signals in receiver 50 and transmitter 52 may be adaptively controlled through automatic gain control algorithms implemented in DSP 58.

In a data communication mode a received signal, such as a text message or web page download, is processed by the communication subsystem 34 and is provided as an input to microprocessor 30. The received signal is then further processed by microprocessor 30 which can then generate an output to display 14A or to auxiliary I/O port 38. A user may also compose data items, such as e-mail messages, using keys 24, trackball 20, or a thumbwheel (not shown), and/or some other auxiliary I/O device connected to port 38, such as a keypad, a rocker key, a separate thumbwheel or some other input device. The composed data items may then be transmitted over communication network 68 via communication subsystem 34.

In a voice communication mode, overall operation of device 10 is substantially similar to the data communication mode, except that received signals are output to speaker 16, and signals for transmission are generated by microphone 28. Alternative voice or audio I/O subsystems, such as a voice message recording subsystem, may also be implemented on device 10.

Short-range communication subsystem 36 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering electronics of the mobile handheld communication device is power source 62 (shown in FIG. 2 as "battery"). Preferably, the power source 62 includes one or more batteries. More preferably, the power source 62 is a single battery pack, especially a rechargeable battery pack. A power switch (not shown) provides an "on/off" switch for device 10. Upon activation of the power switch an application 48 is initiated to turn on device 10. Upon deactivation of the power switch, an application 48 is initiated to turn off device 10. Power to device 10 may also be controlled by other devices and by internal software applications. Additional supplementary power may be provided by additional circuits (which may be referred to as modules) and components in device 10.

A touchpad (not shown) may also be provided for device 10, which provides a surface on which a user is meant to glide his finger, in order to provide input signals to move a cursor generated on a graphical user interface (GUI).

Generally, a touchpad may have a series of conductors in a grid where a series of row conductors are separated from a series of column conductors by an insulator layer. A high frequency signal is applied sequentially between pairs in the grid and the current that passes between the nodes is proportional to the capacitance. A user's finger provides a virtual ground at points in the grid, resulting in a change in capacitance at that location. Alternatively, a capacitive shunt circuit may be provided to sense change in capacitance between a transmitter and receiver that are on opposite sides of the sensor. When a finger is placed between the transmitter and receiver, a ground is created which decreases the local capacitance, which can be detected as a position in the touchpad.

Display 14A has backlight system 64 to assist in the viewing of display 14A, especially under low-light conditions. A backlight system is typically present in a LCD. A typical backlight system comprises a lighting source, such as a series of LEDs or a lamp located behind the LCD panel of the display and a controller to control activation of the lighting source. The lamp may be fluorescent, incandescent, electroluminescent or any other suitable light source known to a person of skill in the art. As the lighting sources are illuminated, their light shines through the LCD panel providing backlight to the display. The intensity of the backlight level may be controlled by the controller by selectively activating a selected number of lighting sources (e.g. one, several or all LEDs) or by selectively controlling the activation duty cycle of the activated lighting sources (e.g. a duty cycle anywhere between 0% to 100% may be used).

To assist with one method of adjusting the backlight level, light sensor 66 is provided on device 10. Sensor 66 is a light sensitive device which converts detected light levels into an electrical signal, such as a voltage or a current. It may be located anywhere on device 10, having considerations for aesthetics and operation characteristics of sensor 66. In one embodiment, an opening for light to be received by sensor 66 is located on the front cover of the housing of device 10 to reduce the possibility of blockage of the opening. In other embodiments, multiple sensors 66 may be provided and the software may provide different emphasis on signals provided from different sensors 66. The signal(s) provided by sensor(s) 66 can be used by a circuit in device 10 to determine when device 10 is in a well-lit, dimly lit or moderately-lit environment. This information can then be used to control backlight levels for display 14A. It will be appreciated that a number of discrete ambient lighting levels may be recognized by sensor(s) 66. Progressions between levels may or may not be separated by a constant change in lighting intensity. In some embodiments, LED indicator 18 may be also used as a light sensor.

Device 10 is provided with the above noted input devices and input module 70. Input module 70 provides a physical motion for device 10 to provide a feedback sensation when an input device is activated on device 10. The input module detects which input device has been activated and if needed a location of activation. It may also provide a signal to initiate a visual signal (e.g. a flashing light) or an audible signal (e.g. a "beep" from a speaker). An additional feature of input module 70 may include a circuit to harness at least some of the physical energy that is imparted on device 10 during activation of the input device. The harnessed energy is converted by the module into a voltage which may be used in other components and modules in device 10. One embodiment of input module 70 is provided as a circuit that monitors for physical activation of keys, such as virtual keys in display 14B. Further detail on input module 70 is provided below.

Now, brief descriptions are provided on the applications 48 stored and executed in device 10. Voice communication module 48A and data communication module 48B have been mentioned previously. Voice communication module 48A handles voice-based communication such as telephone communication, and data communication module 48B handles data-based communication such as e-mail. In some embodiments, one or more communication processing functions may be shared between modules 48A and 48B. Additional applications include calendar 48C which tracks appointments and other status matters relating to the user and device 10. Calendar 48C is activated by activation of calendar icon 26A on display 14A. It provides a daily/weekly/month electronic schedule of appointments, meetings and events entered by the user. Calendar 48C tracks time and day data for device 10 using processor 18 and internal clock 46. The schedule contains data relating to the current accessibility of the user. For example it can indicate when the user is busy, not busy, available or not available. In use, calendar 48C generates input screens on display 14A prompting the user to input scheduled events. Alternatively, notification for scheduled events could be received via an encoded signal in a received communication, such as an e-mail, SMS message or voicemail message. Once the data relating to the event is entered, calendar 48C stores processes information relating to the event; generates data relating to the event; and stores the data in memory in device 10.

Address book 48D enables device 10 to store contact information for persons and organizations. Address book 48D is activated by activation of address book icon 26D on display 14A. Names, addresses, telephone numbers, e-mail addresses, cellphone numbers and other contact information is stored. The data can be entered through keys 24 or keys on display 14B and is stored in an accessible database in nonvolatile memory, such as persistent storage 74, flash memory 42 or any other electronic storage provided in device 10.

Email application 48E provides modules to allow user of device 10 to generate email messages on device 10 and send them to their addressees. Application 48E also provides a GUI which provides a historical list of emails received, drafted, saved and sent. Text for emails can be entered through keys on display 14B. Email application 48E is activated by activation of email icon 26C on display 14A.

Calculator application 48F provides modules to allow user of device 10 to create and process arithmetic calculations and display the results through a GUI.

Energy application 48G works in conjunction with input module 70 and display 14B to selectively set operation parameters, such as charging parameters, destination of charge parameters etc., that may be controlled through software and variables used in conjunction with hardware/firmware elements in device 10.

Key control application 48H provides a series of templates to allow one or more of defined keys in display 14B to have different assignments depending on a context of the operating environment of device 10. For example, one layout for keys in display 14B is a standard QWERTY keyboard layout. One variant of a QWERTY layout is to present a layout of keys in lower case, as "qwerty" characters. An alternative QWERTY layout is to present a layout of keys in uppercase, as "QWERTY" characters. Other layouts include a layout for numeric keys, a layout for non-English language character sets (e.g. Japanese, French, Korean, Danish, and others).

In one embodiment display 14B is provided as a cholesteric LCD. A cholesteric LCD is bi-stable and can be programmed to have its display to be set and then the power may be disengaged from display 14B. As such, no power or very little power is required to maintain an image of the key for display 14B. Also, LCD 14B is a cholesteric reflective display. A feature of a cholesteric display is that it is a reflective bi-stable technology, as such allowing a passive matrix to produce a relatively high-resolution image. A cholesteric keypad does not necessarily require a coloured filter to display a colour image. Further, a cholesteric substrate is pliable and may be deflected, thereby allowing a key as shown on display 14B to be depressed.

Database 72 is provided to store data and records for applications 48 and other modules and processes. Database 72 may be provided in flash memory 42 or in another data storage element.

With some features of device 10 described above, further detail is now provided on notable aspects of an embodiment. In particular, an embodiment provides a system and method for providing a feedback signal to device 10 after an input device is activated or after a force meant to activate the input device is detected. In addition to providing the feedback signal, an embodiment may harvest part of the external energy provided to device 10 when the input device senses that it is being activated. The harvested energy may be considered to be feedback energy which can then be used by one or more components in device 10.

In an embodiment, activation of an input device on device 10, such as key 24 or a key on display 14B, provides a physical force which is harnessed. The harnessed energy may be used to provide power for circuits associated with the input device or other circuits or modules in the device.

An embodiment has two components relating to an input module or system for an input device. Either or both of the components may be part of an input module or system that is coupled to the input device. The coupling may be in a mechanical, physical and/or electrical sense. The first component is a transducer to sense an activation of an input device and to provide a movement or motion signal to provide a feedback when the sense is triggered. The activation sense may be the detection of a force or pressure against an input device. The feedback may be a motion or movement of a component in the device. Ancillary visual and audible indicators may be generated. The second component is a system that harnesses the energy produced by the transducer and provides it in some form to device 10. Each component is discussed in turn.

For the first component, the embodiment utilizes one or more transducers or any other device that converts a received physical motion into an electrical signal, such as a voltage or current, to detect the input force associated with a key. The transducer(s) are acting as input devices when they are configured to operate as sensors.

In an embodiment a transducer is used as both the input device and the feedback device. In other embodiments, a series of separate transducers may be provided. The transducer may contain piezoelectric material(s) or crystals which are used to generate a voltage in response to the force. In a piezoelectric crystal, internal positive and negative electrical charges are separated, but symmetrically distributed throughout the crystal, so that the crystal has an overall electrically neutral charge. When a mechanical stress is applied to the crystal, the charge symmetry is disturbed, and the resulting asymmetry in the charge in the crystal generates a voltage across the crystal. The generated voltage may be very high. For example, a voltage exceeding 12,000 V (at a low current) may be created in a 1 cm cube of quartz when a 2 kN (k Newtons) force is applied to it.

For the second component, as noted above, a piezoelectric element generates voltages when it is stressed. When a piezoelectric element is used as a sensor and when it is stressed, a voltage is generated which can be used as a signal indicating activation of an input area associated with the element. The voltage may be quite high. A circuit is provided to receive the voltage generated by the piezoelectric element and provide it to charge or power other elements in device 10. To harness the energy, the generated voltage may be provided to a rectifier circuit to convert the voltage to a DC value, which may then be stored and used as needed by other circuits.

Further details are provided on piezoelectric elements. A piezoelectric material is a transducer and as such may be both a sensor, creating voltages as described above, and an actuator. As an actuator, the transducer can be used to provide a feedback signal. In particular, when a piezoelectric material is subjected to an electric voltage, a converse piezoelectric effect is produced, where the crystal deforms in shape in response to the voltage.

Different electrical/deformation effects can be exhibited by a piezoelectric crystal, depending on how it is cut, including transverse, longitudinal, and shear effects. In a transverse effect, when a force is applied along a neutral axis of the crystal, the piezoelectric material generates an electrical voltage in a perpendicular direction to the force. In both longitudinal and shear effects, the amount of voltage produced is proportional only to the applied force as applied and the direction of the force does not affect the voltage.

Exemplary piezoelectric materials include crystals, ceramics and polymers. Man-made piezoelectric ceramics include: barium titanate ($BaTiO_3$), lead titanate ($PbTiO_3$), lead zirconate titanate (typically referred to by the acronym "PZT"), potassium niobate ($KNbO_3$), lithium niobate ($LiNbO_3$), lithium tantalate ($LiTaO_3$), sodium tungstate ($Na_xWO_3$), polyvinylidene fluoride (PVDF) and P(VDF-TrFE) which is a co-polymer of PVDF. An optically transparent piezoelectric polymer may also be used, which is sometimes referred to as an electro active polymer (EAP). Some optically transparent piezoelectric polymers include: lanthanum-modified lead zirconate titanate (PLZT) and lead magnesium niobate-lead titanate (PMN-PT).

Electrically, a piezoelectric transducer has very high direct current (DC) output impedance and may be represented schematically in a circuit diagram as a capacitor or as a proportional voltage source and filter network. A voltage at the source is directly proportional to the applied force, pressure or strain.

A piezoelectric transducer may be provided in many forms, depending on how it will be used. As a unimorph form, a single piezoelectric element is provided, typically comprising of a ceramic material. As a bimorph form, a center substrate has a first piezoelectric elements provided on one face of the substrate and a second piezoelectric element provided on the opposite face of the substrate. One piezoelectric element would be configured to operate as an actuator and the other would be configured to operate as a sensor. In another form, a piezoelectric transducer may be provide in a (ductile) fibre form, which may be made from spinning and drawing a fibre of piezoelectric crystal material from a larger shaped block through a viscous suspension spinning process (VSSP) known in the art. Such fibres typically have a diameter of between about 10 microns to 250 microns or more. As a reference, a human hair has a diameter of approximately 100 microns. In one fibre form, a piezoelectric transducer may have a coefficient value of D33, where a voltage can be generated along its length. Alternatively, the fibres may be produced by dicing a thin sheet of piezoelectric material into rectanguloid strands having square or oblong cross sections in the range of 100 microns in cross-sectional length. The generated voltage may be a highly damped alternating AC voltage. Voltages in the range of 300 Vac (peak to peak) have been measured in response to an initial activation force.

Figure 3A:
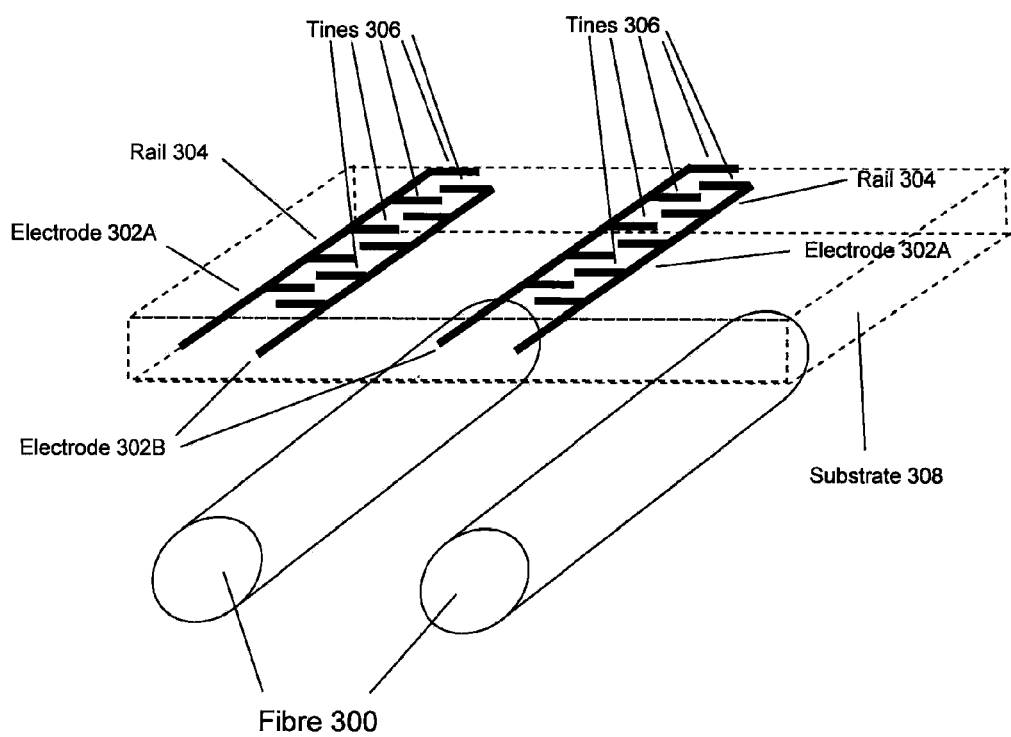
FIG. 3A is a schematic profile diagram of a segment of a piezoelectric fibre with its electrodes as provided for the input device of FIG. 2.

Referring to FIG. 3A, a section of two piezoelectric fibres 300 are shown. As was described earlier, fibre 300 may have a diameter in the range of approximately 10 microns to over 250 microns. It may be comprised of a ceramic, piezoelectric, electrostrictive and/or electro active polymer material. It may be translucent, opaque or transparent. Implementation of transparent electrodes complement a transparent or translucent transducer. The electrodes may have indium titanium oxide (ITO) in their composition. If a transparent transducer is mounted in front of a viewing area of display 14, then use of a transparent electrode such as ITO in order to electrically interface to the transducer would complement its transparency.

Each fibre 300 may be implemented in a D33 coefficient arrangement, so that a deformation along its length (e.g. from a force applied rapidly towards its center, as if being pressed on) will generate a voltage.

For each fibre 300 a pair of electrodes 302A and 302B are provided to sense deformations and sense and transmit voltage generated by such deformations to additional conductors. Each electrode 302 comprises a rail 304 and a plurality of tines radiating outwardly along the length of rail 304 in a parallel symmetric spaced relationship to each other. Electrodes 302 may be provided in pair sets and may be encased in or sputtered onto a substrate. Each electrode 302, rail 304 and tine 306 may be formed with sputtered silver, an ITO electrode pattern in or on substrate 308, and/or bare wire (in which case the wire would reduce the width of the transducer). The electrodes may be transparent. An insulator may be provided between piezoelectric fibres and rails.

The tines of opposing electrodes 302A (negative) and 302B (positive) are interlaced among each other in an alternating fashion. In a "resting" (i.e. uncompressed) position, tines 306A and 306B are in a spaced relationship from the surface of fibre 300 and from each other.

When fibre 300 is deformed (i.e. compressed) from a force applied above tines 306, the force deforms the piezoelectric fibre, which produces a charge in the fibre that may be detected by the electrodes and then transferred to an energy storage device (such as a capacitor). The transfer may be provided through a rectifier circuit. The electrodes may be in contact with the fibre and this does not change when a force is applied. Therein, the voltage generated in fibre 300 is detected in the electrodes. One electrode 302B is the anode for the voltage produced in fibre 300 and the other electrode 302A is the cathode. Connections to electrodes 302 allow the generated voltage to be transmitted to another circuit. A pair of opposing electrodes 302 will define a sensing region along the fibre 300. One or more pairs of electrodes 302 may be provided along a length of fibre 300.

Figure 3B:
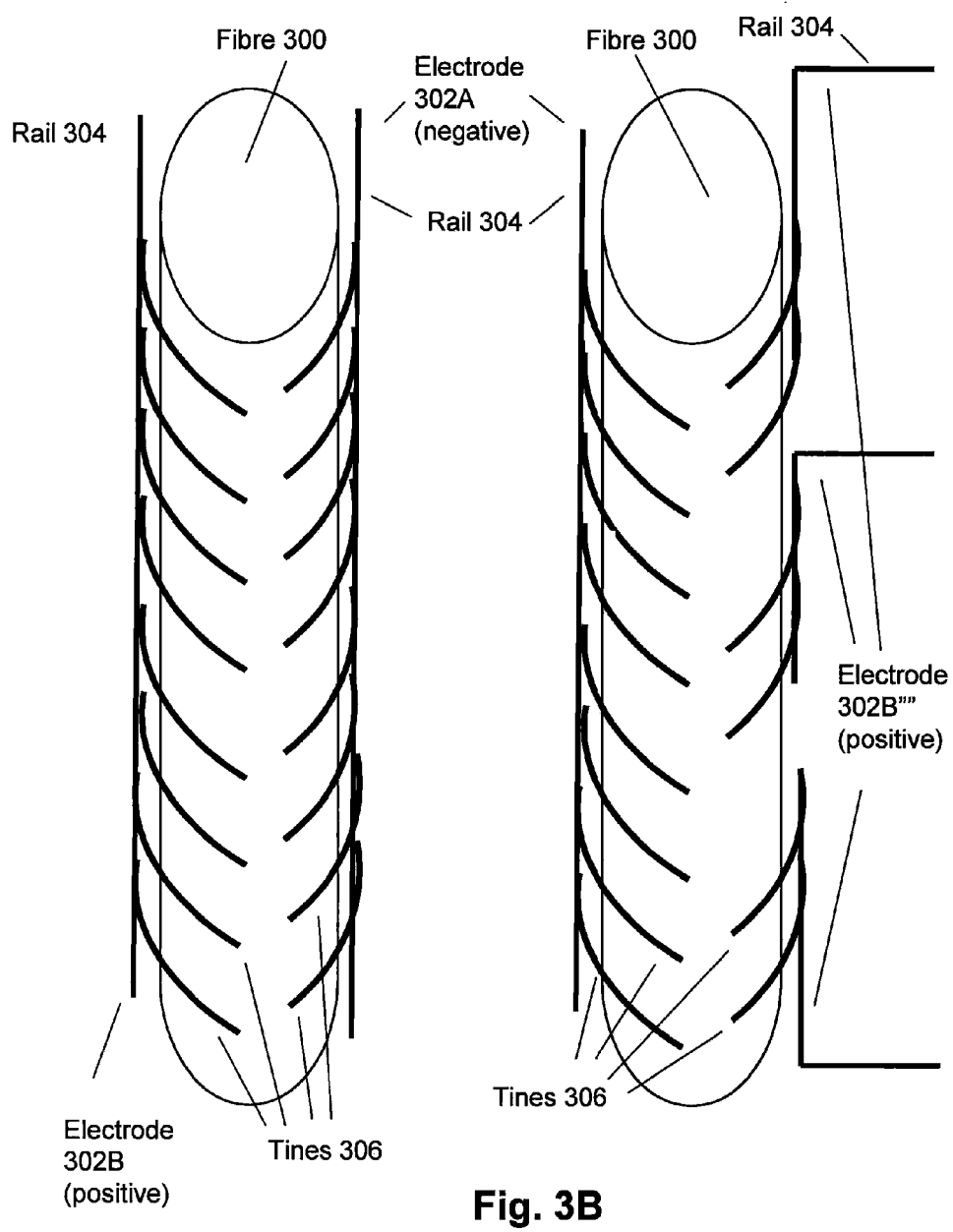
FIG. 3B is a schematic profile diagram of another segment of a piezoelectric fibre with its electrodes as provided for the input device of FIG. 2.

Referring to FIG. 3B, in another embodiment, electrodes 302A and 302B are connected to fibre 300 along their length by the rail 304. Tines 306 radiating from electrodes 302, but do not touch the surface of fibre 300. Additionally or alternatively a negative electrode may extend across a section of fibre 300 and along that section a plurality of separate positive electrodes 302B" (FIG. 3B) that provide zones of stress detection areas along the section. Similar sections may be provided in for sputtered electrodes per FIG. 3A. Other orientations of electrodes are possible. The electrodes may be oriented on the sides, top or bottom of fibre 300. The opposing electrodes may be aligned in parallel to each other or section of the electrodes may converge or diverge. Pairs of electrodes 300 may wind around fibre 300.

Figure 4A:
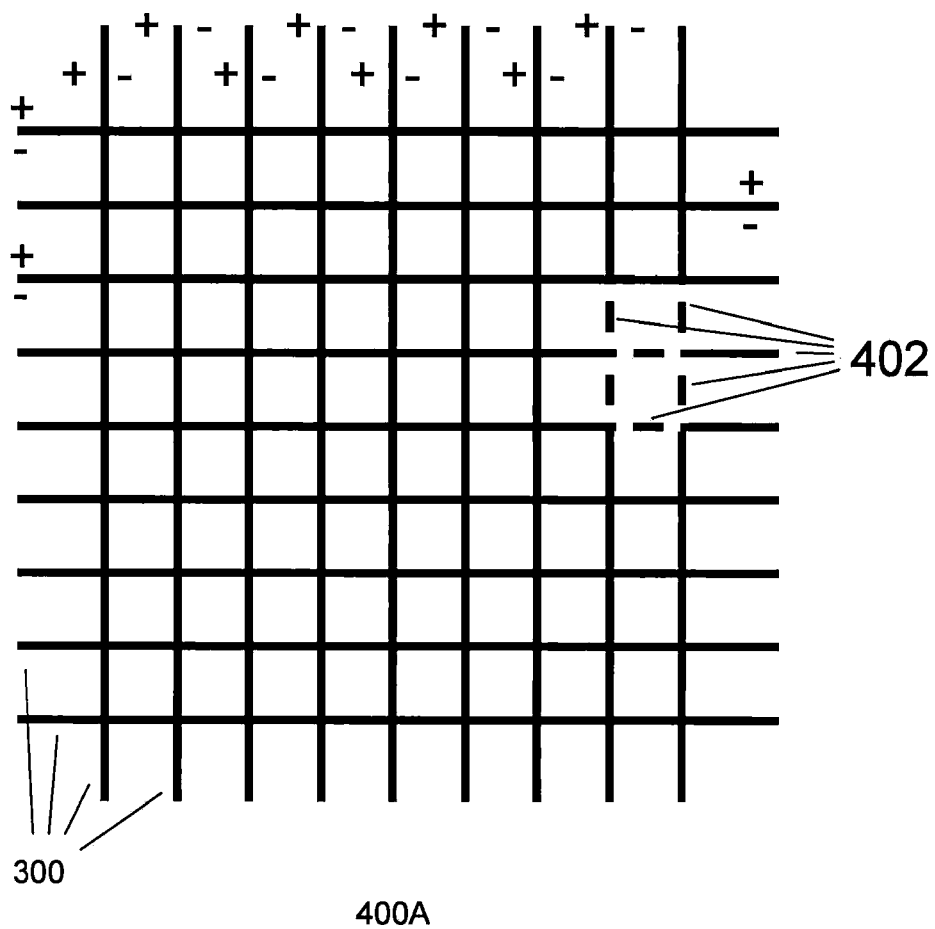
FIG. 4A is a schematic of an exemplary layout of the piezoelectric fibre of FIG. 3 for the input device of FIG. 2.
Figure 4B:
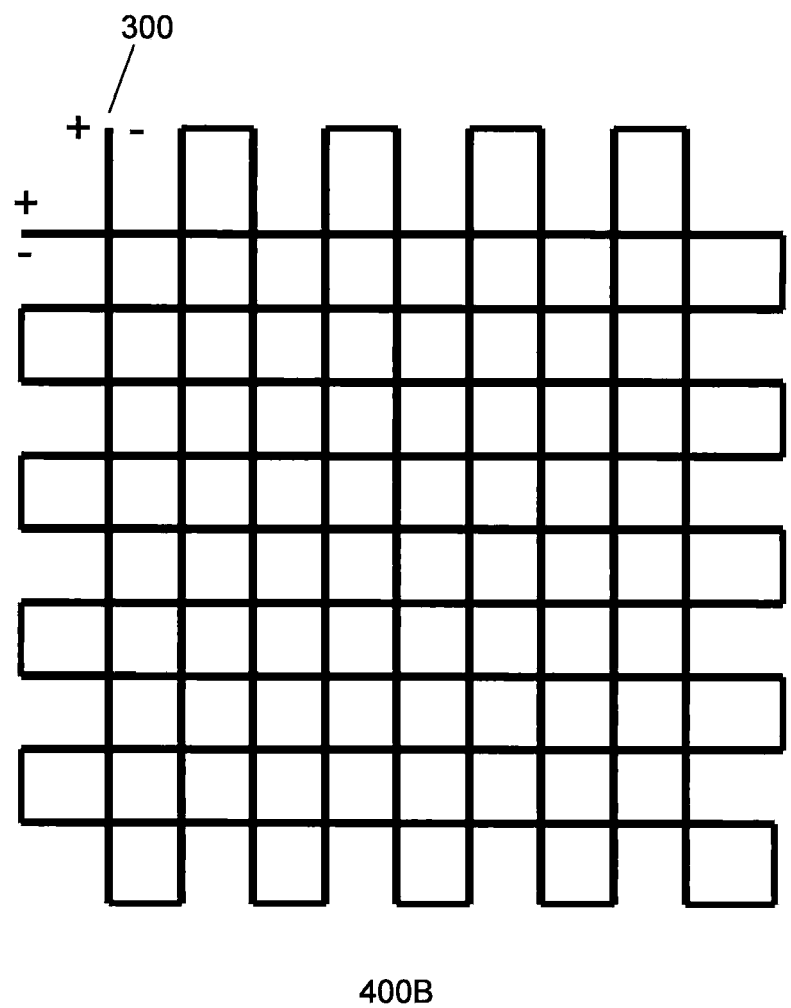
FIG. 4B is a schematic of another exemplary layout of the piezoelectric fibre of FIG. 3 for the input device of FIG. 2.

Referring to FIGS. 4A and 4B exemplary layouts of fibre 300 are provided. Fibre 300, once oriented, may be encased in a substrate that would allow pressure from an external force applied to the substrate to be transmitted through the body of the substrate to fibre 300. Along fibre 300, a series of electrodes 302 are provided as described earlier. In FIG. 4A, layout 400A is a grid of individual, separate fibres 300 arranged in a set of row fibres on top (or below) a set of column fibres. Electrodes 302B and 302A may be associated with one or more segments of the fibres and are shown as "+" and "−" symbols. As noted earlier, electrodes may be sputtered in a layer that is on top of the fibres and/or may be connected to one or more segments of the fibres. The electrodes may be arranged to alternate positive and negative electrodes 302 between selected fibres 300. Alternatively or additionally, some rows and column fibres 300 may be intertwined with other fibres. As noted above, a typical diameter of fibre 300 is between about 10 microns to over 250 microns. Spacing between fibres 300 may be between about 10 microns to over 750 microns. The spacing may change in regions in layout 400A. Layout 400A includes a section where a series of fibre segments 402 are provided. Each fibre segment 402 may have separate electrodes. The signals from the segments 402 may be analyzed or associated with specific locations to determine an area where pressure is being applied or where a local feedback sense may be generated. In FIG. 4B, a continuous fibre is woven into a pattern of connected rows overlapped with a pattern of connected columns per pattern 400B. It will be seen that electrodes 302 may be placed a regular or varying intervals along fibre 300 such that a "grid" of sensors is provided. One or more sets of electrodes 302A and 302B may be provided along fibre 300. If appropriate, the polarity of electrodes may switch along the length of fibre 300. In both FIGS. 4A and 4B, the arrangement of fibres 300 may be oriented and encased in a substrate and/or polymer so that they are generally horizontal to the major front face of device 10. An embodiment may provide a combination of fibres having features from pattern 400A and 400B. Additionally still, a plurality of separate segments of fibres 300 may be laid out in a pattern (not shown), where each segments provides separate signals to device 10.

In other embodiments, zones may be defined by bands of parallel fibres arranged in one direction (e.g. the x or y direction).

It will be appreciated that a pattern of fibre(s) 300 is provided, with a corresponding arrangement of electrodes 302 in order to facilitate determining a location of a pressure point being applied to device 10. For example, in either of layout 400A or 400B, when a force is applied within either grid, a series of signals will be generated in the fibres therein. The signals may be processed to determine, for example by triangulation or row/column analysis, to determine an approximate location of the applied force. Once a location is determined, then a local feedback signal can be provided. The arrangement of fibres 300, the composition and their related substrates provide various sensitivities to detect forces. Additional tuning circuits and software filters may be provided as needed to analyze signals from the electrodes. For example, since the dynamics of the generated voltage signal in fibre 300 changes in response to an applied force change as the applied force is moved along the length of the fibre, it is also possible to determine where along the length of fibre 300 that the force was applied using signal processing techniques. This has the benefit of reducing the number of different electrode zones needed to establish location information.

In some embodiments, when the piezoelectric material is used as an actuator, either one or both of its thickness or length may expand during its activation. If a section of fibre 300 is implemented to provide an expanding thickness, then physically opposing conducting layers may be required for the conductors. This may be implemented using a D33 mode of a piezoelectric material. If the length of fibre 300 is designed to expand, then fibre 300 may be implemented with one or two conducting layers. If one conducting layer is used, one layer is preferably implemented as an interdigital electrode pattern and the D33 mode of the piezoelectric material may be utilized. If two conducting layers are used, then two opposing conducting layers may be required and the D31 mode of the piezoelectric material may be utilized. There are some situations where a combination of the two may be desirable.

Also, the interdigital electrode pattern may be aligned with fibre 300 at any angle, such that its tines do not necessarily have to be at right angles to the piezoelectric fibres. When electrodes are oriented on an angle, there will be a twisting motion in an actuator application.

It should also be noted that a piezoelectric fibre may be associated with different interdigital electrode patterns. For example, one pattern may define a sensor region and another pattern may define an actuator region.

Figure 5:
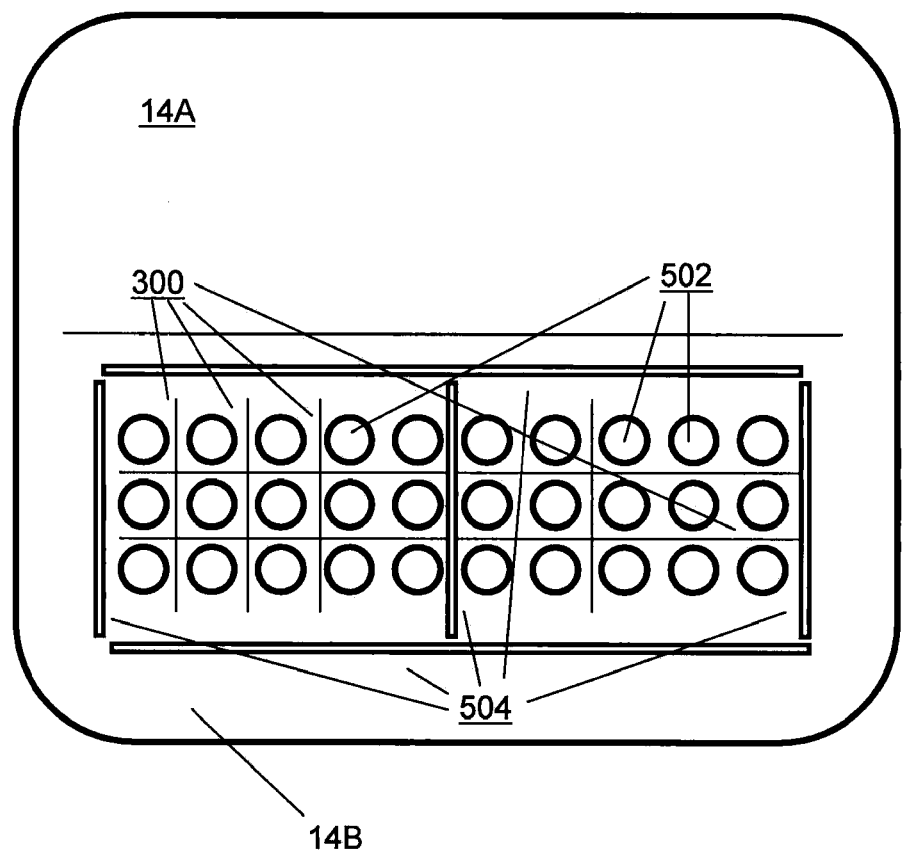
FIG. 5 is a top profile view of an embodiment of a portion of the display and the input device of FIG. 2.

Now, further detail is provided on the use of piezoelectric elements as sensors in an embodiment. Referring to FIG. 5, a portion of display 14B is shown at 500. Keys in display 14B may be demarked by key outlines 502. The outlines may be silk screened on the surface of display 14B. Alternatively, key caps may be provided. When caps are provided, they are preferably composed of material and have dimensions that do not substantially impede the capacitive sensing used by the sensing circuit(s) of display 14B. Keys in display 14B may be partitioned in groups through physical barriers, ridges or separations, shown as ridges 504. An arrangement of fibres 300 may be provided such that they run between "keys" within display 14B in spaces between keys 502, and/or may be incorporated into ridges 504 that are provided within and/or outside the display region 14B and/or are located above or underneath keys 502. Ridges 504 may define any area of interest in display 14B, for example an area relating to one or more keys 502. Ridges 504 may extend upwardly from the surface of display 14B and may define a boundary that provides protection of display 14B from being marked up from things striking it.

Display 14B may be provided as a cholesteric LCD. A cholesteric LCD is bi-stable and can be programmed to have its display to be set and then the power may be disengaged from display 14B. As such, no power or very little power is required to maintain an image of the key for display 14B. In this configuration, a cholesteric substrate for display 14B provides a pliable surface that may be deflected, thereby allowing it to be depressed when a key in display 14B is pressed. Depending on the material composition, layout (e.g. the spacing of adjacent fibres) and dimensions (e.g. diameter) of fibres 300, the layout of fibres 300 may be transparent or translucent, allowing the fibres to be woven, placed, or otherwise located in a substrate above, below or even within display 14B and may impart a minor or virtually no visual distortions of elements located underneath them.

Figure 6:
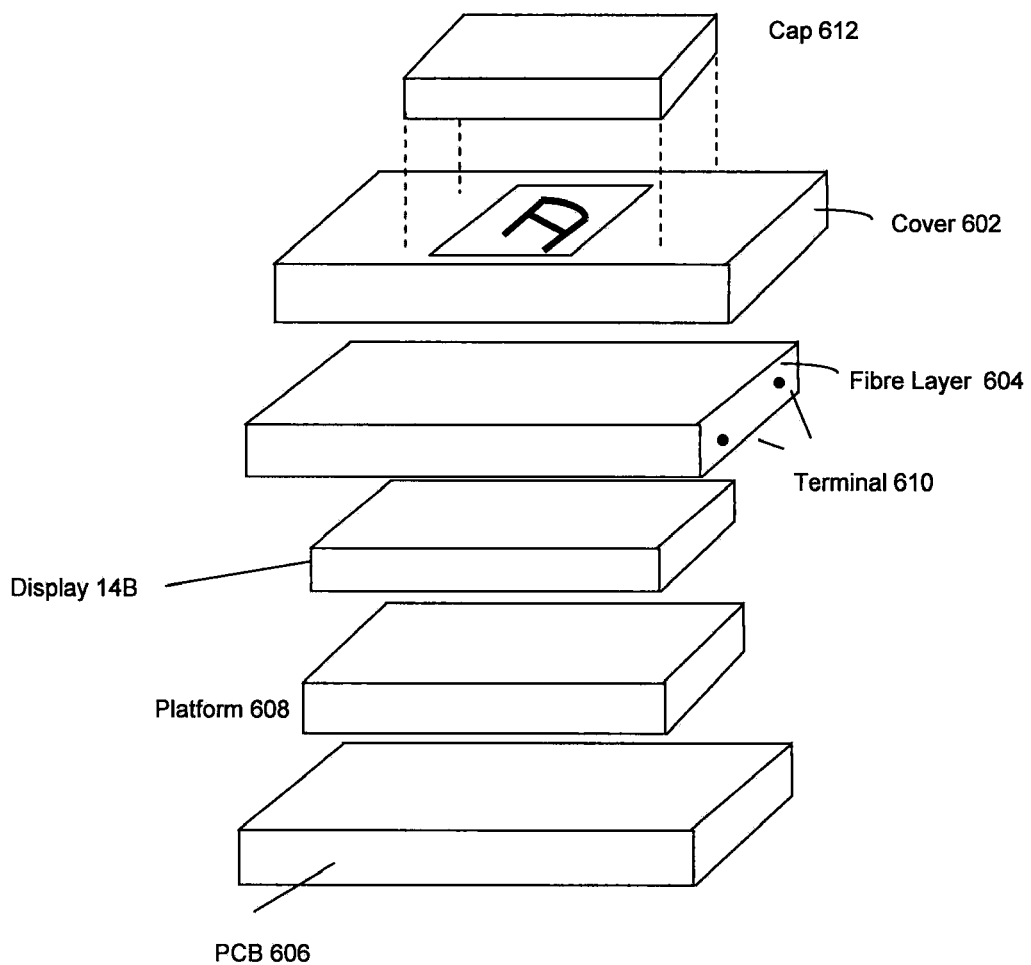
FIG. 6 is a top cross-sectional exploded view of parts of the key in the display and the input device of FIG. 2.

Further detail is now provided on the transducer and energy harvesting components of an embodiment. Referring to FIG. 6, an exploded cross-sectional view of components comprising the electromechanical elements underneath a key in display 14B is shown. It will be appreciated that the embodiment may be for a single key, a group of keys or all keys in display 14B. In an embodiment, key 600 is shown. For a given key 600, lens 602 covers display 14B and fibre layer 604. Lens 602 may be composed of glass or polycarbonate and may have sufficient flex to allow a pressure applied to it to be imparted to components underneath it. Fibre layer 604 includes fibre 300 (not shown) and electrodes 302 (not shown) arranged in a pattern, for example, one of patterns 400A and 400B of FIGS. 4A and 4B. Fibre layer 604 may be suspended above printed circuit board (PCB) 606 by platform 608. Platform 608 provides a riser for display 14B from PCB 606. In some instances, platform 608 may not be provided or it may be incorporated with display 14B. There can be a gap between the bottom of fibre layer 604 and PCB 608. Terminals 610 in fibre layer 604 provide electrical contacts from electrodes 302A and 302B of fibres 300 in fibre layer 604. As such, when fibre 300 is operating as a sensor, terminals 610 transmit any output voltage signals generated by fibre 300 to additional circuits, sub-circuits or modules in device 10. When fibre 300 is operating as an actuator, outside control signals are provided to terminals 610 to control activation of parts of fibre 300. There may be multiple terminals 610 each connecting to different electrodes of fibre 300. Cap 612 is provided on top of the area for the key and is used to provide a positive physical feature to mark the key. Again, it may be have various shapes, sizes and compositions in order to facilitate the capacitive sensing used with display 14B. In other embodiments, one or more fibres or fibre layers 604 may be provided such that the one or more fibres and/or layers are either above the display, below it, and/or incorporated into additional or existing layers around or embedded in display 14 or in a substrate associated with or disposed on display 14. For example, a fibre layer may be located in a cover or lens for display 14 and/or in an elastomer layer located below display 14.

In forming fibre layer 604, it may be comprised of several sublayers. A first sublayer (starting from the top) may be a layer of ITO sputtered against lens 602 forming one transparent electrode layer. Underneath the electrode layer, the matrix of fibres 300 have a polymer, resin or substrate material provided therein suspending the fibres in the layer. In some arrangements, the fibres may always be in contact with the electrodes. Finally, below the fibres and polymer, a second ITO may be sputtered into the lens (or below fibres 300) to form the complementary electrodes for fibres 300. Finally, a (transparent) flexible polymer may be placed underneath the fibres 300 electrodes. Additionally or alternatively, the first ITO may include a second sputtering that provides a complementary set of electrodes for fibres in fibre layer 604.

In another composition, fibres 300 may be bonded to display 14B or its associated lens or cover.

It will be appreciated that other embodiments fibres 300 or other piezoelectric transducer may be provided in addition to other input devices on device 10. For example, an arrangement may provide a key assembly that has some electromechanical switching mechanisms to provide additional signal(s) when the key is pressed (or not pressed) with fibres 300. Further still, a key with a transducer may be provided in a section of device 10 that is separated from display 14A and display 14B. In that embodiment, an elastomer layer and/or a fibre layer 604 may be placed directly below lens 602 and no display 14B is present. Additionally, a further electromechanical switch may be provided.

Figure 7A:
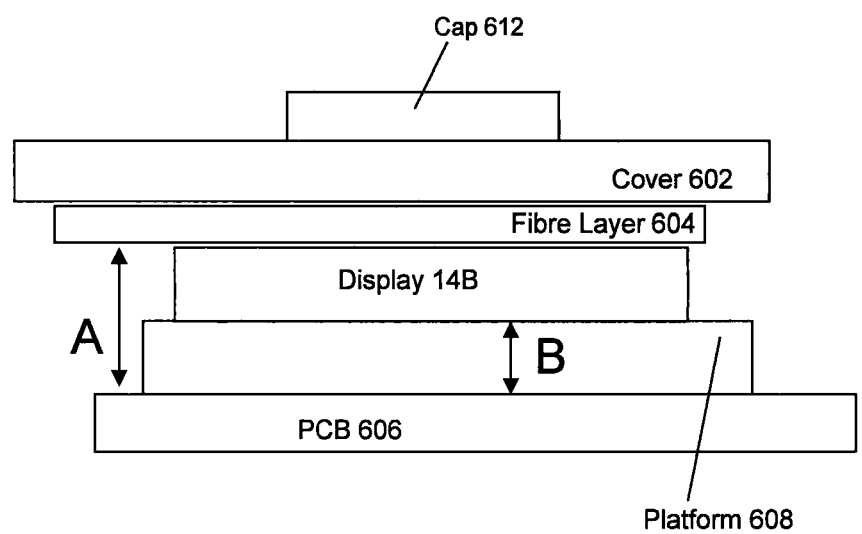
FIG. 7A is a side cross-sectional view of the key in the display and the input device of FIG. 2 in a first, unactivated position.

Further detail is now provided on how fibres 300 are stressed when provided as transducers for device 10. In FIG. 7A, cap 612 is shown as fitting over a region in display 14B that has been designated as a key. Key cap 612 is generally a flat, thin, rigid piece of polycarbonate that is shaped to fit to be the size of a regular key. It may be transparent, tinted or opaque. One function of cap 612 is to transmit the inward, downward external force applied by the user when activating the key to the fibres in substrate 604. As such, cap 612 assists in stiffening the exposed exterior area around key in display 14B. Cap 612 may be glued or welded individually to the key region above its local key area for display 14B. Alternatively, cap 612 may be mounted on or moulded with a substrate and the substrate may be laid on top of cover 602 for display 14B. Further still, another embodiment may not employ a cap. Use of cap 612 is dependent on how its presence affect the operation of an underlying detection circuit for display 14B.

Cap 612 is shown as a separate component for a specific key. In other embodiments, cap 612 may be integrated as an element in cover 602. In such a cover, individual keys may be connected to each other by a web or other material. Such a web may be thinner in thickness than cap 612 and/or may be made from a (more) flexible material, in order to isolate movement of cap 612 from adjacent caps 610.

Figure 7B:
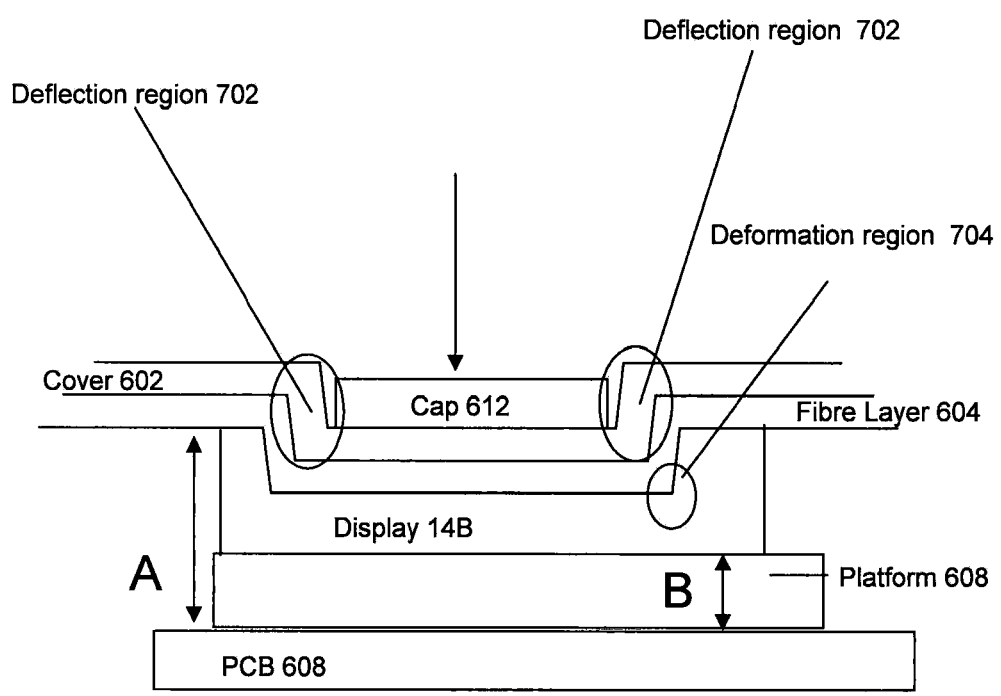
FIG. 7B is a side cross-sectional view of the key in the display and the input device of FIG. 2 in a second, depressed position.

Referring to FIGS. 7A and 7B, further detail is provided on fibre layer 604 with its fibres and electrodes above display 14B. In fibre layer 604, its transducers are provided as a pattern piezoelectric fibres that are oriented in a horizontal orientation relative to display 14B. Its specific shape, size, orientation and location of the fibres may be custom-designed per physical and performance requirements of the key and the energy recovery system. There may or may not be a gap between the bottom of cover 602 and the top of fibre layer 604. The distance between the bottom of fibre layer 604 and the top surface of PCB 606 is noted as distance "A". Platform 608 elevates display 14B above PCB 606. As such, there is a gap of distance "B" exists between the bottom of display 14B and the top of PCB 606. Distance "B" is smaller than distance "A". In this embodiment, display 14B has sufficient longitudinal rigidity to be suspended by platform 608 and to still be able to detect external forces applied thereon. In other embodiments, two or more ends of display 14B may be supported by other platforms, posts, riser, standoff or the like. Further, platform 608 may be affixed to other parts of device 10, such as to its housing.

Additionally or alternatively, an arrangement may be provided where the fibre layer 604 is located in a spaced relationship in a different orientation to the display 14B and a mechanical device is provided to transmit the received motion to the location of the transducer. For example, the fibre layer 604 may be oriented generally upright on PCB 606 and a combination of rods, gears, springs, etc. may be provided to translate and transmit the downward movement caused by the deflection in cover 602 to a horizontal movement that is provided to the surface of fibre layer 604. To complete a physical presentation of the key in display 14B, cap 612 may be provided and is located on top of display 14B above the area where cover 602 is located.

Referring to FIG. 7B, as downward pressure is placed on cap 612, display 14B deflects inward towards PCB 606. As such, fibre layer 604 also deflects downward. As cap 612 evenly distributes the downward pressure across its surface at the edge of cap 612 on cover 602, there is a deflection region of fibre layer 604 as noted as deflection regions 702. As fibre layer 604 is forced downward, it is deflected downward and is compressed, such that there is a compression of affected fibres (or parts thereof) in fibre layer 604. A fibre 300 in fibre layer 604 may or may not be directly underneath cap 612. If a fibre is sufficiently close to cap 612 (for example if a portion of fibre 300 is adjacent to cap 612), it may be imparted with some of the force imparted on cap 612. It will be appreciated that the amount of deflection and compression will depend on the composition of the materials of fibre layer 604, cover 602 and even cap 612. The degree of deflection 702 is shown in large scale to illustrate the deflection region. Display 14B may be deformed in deformation region 704 due to the imparted pressure from deflection region 702.

As noted before as fibre layer 604 is compressed, deflected and otherwise stressed, fibres 300 (not shown) therein generate a voltage which is picked up by electrodes 302 (not shown) when its internal electrical charges become asymmetric from the force. This voltage is carried through electrodes 302 to terminals 610, which is then carried to other components and modules in device 10. The arrangement of electrodes (such as the pairing of electrodes 302 or having multiple positive electrodes 302B along a negative electrode 302A, as described earlier) may provide electric signals that may be analyzed to identify a location from which a force being applied.

Additionally, two exemplary modes may be provided for the sensors: G33 and G31 modes, where g denotes mechanical to electrical conversion. The G31 and G33 modes for a sensor are equivalent to D31 and D33 for an actuator. Also, the fibres may be cantilevered or mounted as a simple beam support configuration where the two ends are fixed. When a user presses in the middle, the piezoelectric material must stretch as it is bonded to the lens which is bending in response to the applied force.

Further if fibres 300 are situated in other locations around an input device, for example around display 14B as noted in regards to FIG. 5, fibre 300 and fibre layer 604 may be customized to fit into their designed location.

In an embodiment fibre layer 604, at least when implemented as a piezoelectric element, provides both sensing and feedback functions for device 10. One sensing function is to sense activation of the related key or command in display 14B. One feedback function is to provide a feedback signal to device 10 upon a certain trigger condition. The trigger condition may include the sensing of the activation of a key in display 14B.

Generally, between about 3 and 6 N (Newtons) of force needs to be applied to a piezoelectric transducer, when it is configured to operate as an sensor, in order to trigger a positive actuator condition. When a transducer is configured to be a key input, it is useful from a human interface point of view to provide some physical feedback signal through device 10, when the key input is activated. Generally, a force of approximately 0.7 N is provided, but it will be appreciated that feedback forces of up to 3 N or more may be provided, depending on requirements. As an exemplary range, a feedback signal of up to about 2.0 N can be provided. The feedback signal may be provided as a rumble signal (with a low frequency resonance around approximately 150 Hz) through the transducer. Other frequencies may be provided, such as in a range between 50 Hz to 2000 Hz. The amplitude of the signal may depend on the transducer. It can be seen that the difference between the force provided from the input instance and the feedback force is:

$$\text{force difference} = \text{input force} - \text{feedback signal force} \quad \text{Equation 1}$$
$$= (3 \text{ to } 6 \text{ N}) - 0.7 \text{ N}$$
$$= \text{between about 2.3 N and 5.3 N}$$

The force may be a force felt in "free space", it may be a force as felt in the device and/or may also be an impulse force. One preferred characteristic of the response signal is to have a relatively sharp rise in the voltage to the piezoelectric material and a less steep decay. If the rise is too fast, more audible noise is generated than tactile feel. If the rise is too slow, then a rubbery feel is provided. In experimentation, a rise time of 300 μs was noted providing a good sensation. For the decay, if too fast of a decay is provided, there is a second audible click. This may or may not be wanted. A decay that is too slow leaves the actuator not ready for a next event (the next tactile response). If a frequency signal of about 150 Hz to 250 Hz is provided, then the signal may be limited to one to five periods.

The force applied may be harvested by input module 70. The energy (voltage) recovered by input module 70 may be used by device 10 in other circuits or sub-circuits. Exemplary uses include to recharge one or more batteries, to supplement a voltage required for a circuit or to replace a voltage source for a circuit. A tapping of fibre 300 along its length produces different waveform outputs. In addition or alternative to the patterns of electrodes 302 relating to FIG. 3, energy application 48G (with additional processing from a digital signed processor) may calculate correlations on signals provided from the electrodes to determine a location of a tap along the length of the electrode.

Figure 8:
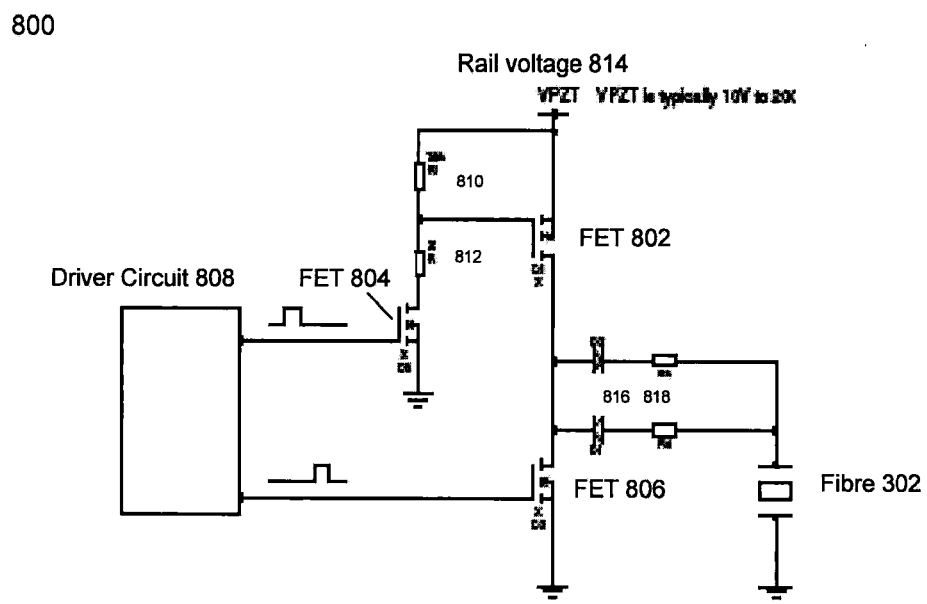
FIG. 8 is block circuit diagram of a drive circuit associated with the input module of FIG. 2.

Further detail is now provided on a feedback mechanism provided by an embodiment. Referring to FIG. 8, as part of input module 70, circuit 800 provides the high voltage required to energize fibres in fibre layer 604 in order for fibres 300 to energize a movement thereof. Circuit 800 may be provided for one or more fibres in a fibre layout. One or more fibres or other transducers may be associated with one or more circuits comparable to circuit 800. The movement can be used as a physical feedback signal upon activation of a key, such as a key in keypad 14B. Fibre 300 may be in an activated state, where it vibrates at a particular frequency and amplitude, a bent state, where fibre 300 is bending and a resting state, where fibre 300 is flat, i.e. not activated. One signal that may be used to activate fibre 300 is an impulse signal. When fibre 300 is driven, it can contract or expand in length based on the polarity of the signal. In the embodiment, one reaction signal has the fibres 300 expanding and contracting that pushes outwardly (upwardly) on the display/substrate at a location when the user is currently pressing on the fibres 300, thereby providing localized feedback to the input force.

In order to energize fibres 300, a positive voltage is applied to terminal 302B of fibre 300. Voltage to positive terminal 302B is controlled in part by signals provided by positive channel (P-ch) field effect transistor (FET) 802. FET 802 is activated (i.e. "turned on") by the activation of negative channel (N-ch) FET 804, which itself is activated by the presence of a sufficiently high voltage present between its gate to source junction, which would be in the order of 2.5 volts. FET 804 is provided to translate the Vgs voltages present on the gate of FET 802 to a lower voltage that a logic circuit may use to control the output stage. N-ch FET 806 is turned on directly by logic level voltages on its gate-source junction.

In operation, an example of energizing fibre 300 is provided where fibre 300 is in a discharged state. Fibres 300 in fibre layer 604 have an impedance which is primarily capacitive. For a monomorph piezoelectric element driven at 60V to 200 V, the capacitance may be around 60 nF to 200 nF. For a multilayer piezoelectric element, the capacitance may be between about 1 uF and 5 uF, with a lower voltage drive voltage, around as low as approximately 10V. In operation, fibre 300 may be grounded by activating FET 806 full time while device 10 is powered, but grounding may not always be provided. An advantage of maintaining FET 806 in its active state while fibre 300 is discharged is that fibre 300 will itself be placed in a known state (for example, where it is "relaxed", i.e., neither expanding or contracting). FET 802 may be set to be turned off by driving the Vgs voltage at the gate of FET 804 to a low voltage value.

To energize fibre 300, FET 806 is turned off by driving the gate of FET 806 with a logic low voltage signal, as provided by low voltage driver circuit 808, which provides a series of pulses at predetermined intervals or instances. The operation and elements of circuit 808 may be designed using circuits known in the art. For example, the pulses may be generated by a pulse width modulation circuit in circuit 808.

Once the gate of FET 806 is driven low, the voltage at rail 814 is provided to fibre 300. Voltage at rail 814 may be in the order of between about 10 V (or less) and 200 V (or more). The supply for rail 814 may be provided from a storage device (such as a battery or capacitor) or from an active power supply (including a booster circuit or a combination of both. In supplying the rail voltage to fibre 300, an embodiment may use one of at least three circuits between fibre 300 and drive transistors 802 and 806. First, no series diode or resistor may be provided. In this configuration, circuit 808 provides signals to control charge and discharge timing of the capacitive network of fibre 300. Second, one series resistor may be provided. This configuration may be used when only a single charge and discharge pulse for fibre 300 is required. Resistor values of 5 kohm to 10 kohm may be used with some piezoelectric bimorphs that require a series resistor. Third, a combination of diodes 816 and resistors 818 may be provided. A diode and resistor combination allow for different charge and discharge rates to be provided if a single charge and discharge pulse is used.

Turning back to operation of circuit 800, a delay of 50 ns may need to be added after turning off FET 806 to allow FET 806 sufficient "turn-off" time before issuing the activation pulse to FET 804. After FET 806 is turned off, FET 804 is turned on by driving its gate with a logic high. After FET 804 turns on, a voltage resulting from a voltage divider comprising of resistors 810 and 812 is used to drive the base of FET 802 with a voltage around 5 to 30V below the source of FET 802. The resistors 810 and 812 limit the maximum Vgs to comply with rating of FET 802 rating and keep the Vgs high enough to provide an adequate turn on voltage. The larger the value of resistors 810 and 812, the longer it will take to charge the gate capacitance at FET 802, which will slow the turn on of this transistor. In a PWM controlled system provided for circuit 808, lower values of resistors 810 and 812 may be used. Circuit 808 may generate a periodic activation signal to generate an predetermined cyclic activation signal for fibre 300. For example, a periodic PWM signal may be provided to cause fibre 300 to vibrate at a predetermined frequency indicative of a feedback signal. Alternatively, transducer may be provided with an impulse feedback signal created by the PWM to mimic a button click as feedback.

When FET 802 turns on, fibre 300 is charged to the voltage at supply rail 814 with a ramp signal that may be governed by either a PWM duty cycle provided by circuit 808 or a series resistor provided between rail 814 and fibre 300 as noted above. When fibre 300 is so charged, it is operating as an actuator, and hums and vibrates, providing a feedback signal relating to its activation. For example, referring to FIG. 3A, a section of fibre 300 may vibrate along one (or more) of its axis when its associated electrodes place the section in its active state.

To place fibre 300 back to its rest state, FET 802 is turned off by driving the gate of FET 804 low. At this point, fibre 300 will be held in its bent state. To move fibre 300 back to its original rest state, FET 806 is turned on by driving the base of FET 806 with a logic high voltage signal. Preferably, for circuit 800, a delay of approximately 100 ns delay should be provided from the time of turning off FET 802 and turning on FET 806. Such a delay assists in preventing "shoot through" for the P and N channel FETs. The delay can be adjusted to suit the individual delays of the transistor used. The discharge time and profile required may be controlled either by PWM duty cycle or by a series resistor provided between rail 814 and fibre 300 as noted.

Adjustments and variations on the circuit may be provided to suit other implementation needs. One alternative drive circuit breaks the connection between the drains of FET 802 and 806. In that alternative, if FETs 802 and 806 were to be turned on at the same time, the current would be limited by the circuits comprising diodes 816 and resistors 618. (In FIG. 8, with the circuit shown, current would be limited by the Rds of FETs 802 and 806.) Another alternative circuit would be to replace FET 806 with a resistor (not shown). In the alternative circuit, the added resistor between the two drains of FETs 802 and 806 would limit the current. Such a resistor would control the rise time if a PWM is not used, and may be removed or reduced if PWM is used. Other alternatives would replace any of FET 802, FET 804 and their associated resistors with a single resistor connecting fibre 302 to voltage rail 814. This alternation would control the rise time of the charge, but FET 806 would still control the discharge time. A series resistor in line with FET 806 or sufficient PWM signal may be provided to control the discharge time. Yet another alternative is to control the rise time of rail voltage 814 by circuit 808. A circuit would be provided to modulate the output voltage of the switch mode power supply creating rail voltage 814. In other embodiments, other active devices, such as bipolar transistors may be used in addition to or instead of FETs as shown. Such circuits may have similar topologies or different topologies to the circuits shown herein.

Exemplary guidelines for charge and discharge times are as follows. For charging, a charging cycle time of about 300 us has been observed to provide a good click feeling. If the charge time is longer, then the click feeling is more "rubbery" and not as connected to the activation of the related key area. The slower the ramp, the more rubbery the feeling. If the ramp is too quick, fibre 300 has been observed to create more of an audible click instead of a "click" that mimics a click or détente of a plastic key typically used on an electronic device.

For discharging, a feedback can be provided to mimic a click that is heard when a depressed key on an electronic device is released by a user. However, this feedback may not typically be desired. As such, a discharge rate may be selected to be sufficiently slow so that fibre 300 does not make a loud click when it moves back to its original position, but also sufficiently fast to be ready for the next charge cycle. It has been observed that a discharge time around 3 ms, but more than 1 ms satisfies these parameters.

The value of the cycle times may be controlled and modified by one or more of the associated circuitry and energy application 48G.

It will be appreciated that a portion of fibre 300 or specific fibre 300 (depending on the layout of fibres 300 provided in device 10) may be designated as a region of fibre 300 that provides a localized feedback signal. The location of the portion should be sufficiently close to the location of the pressure being applied to act as a useful feedback signal.

Further detail is now provided on the second component system (namely an energy recovery system) relating to an embodiment. In particular, as noted above, fibre 300 (FIG. 7) in display 14B may be used as a sensor. As such, as described earlier, when a force is applied to it, fibre 300 generates a voltage. This voltage may be harnessed.

Figure 9:
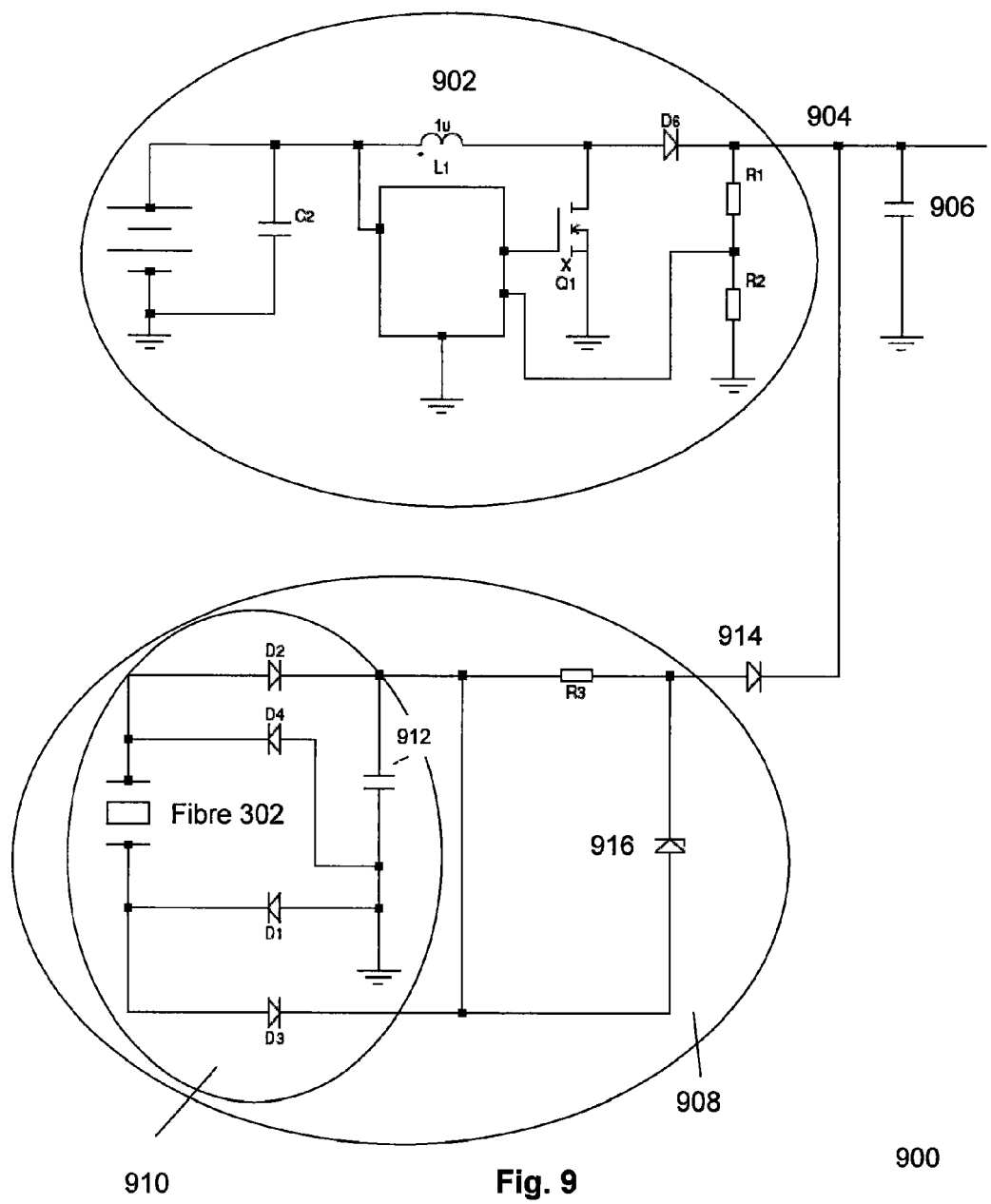
FIG. 9 is a block circuit diagram of an energy harvesting circuit associated with the input module of FIG. 2.

Referring to FIG. 9, as a further part of input module 70, circuit 900 is provided and shows a drive and an energy recovery and storage circuit, which may be used to provide a rail voltage 814 (FIG. 8) for fibre 300. One or more fibres or other transducers may be associated with one or more circuits comparable to circuit 900. Circuit 902 is an asynchronous boost converter circuit that provides at least a portion of the voltage for rail 814 (FIG. 8), in a known power supply circuit layout. The output voltage from circuit 902 at node 904 is provided to charge capacitor 906. The energy stored in capacitor 906 may be provided, when triggered, to circuit 800. For example, an output from capacitor 906 may be provided to supply at least part of rail voltage 814 (FIG. 8). Energy recovery circuit 908 provides a full-wave rectifier circuit 910 to charge capacitor 912 to maximum potential as provided for circuit 908. The input voltage for circuit 910 is provided from fibre 300 and the voltages that it generates while activated. Diode 914 allows the outputs from circuits 902 and 908 to charge capacitor 906 simultaneously without contention. Zener diode 916 protects against over charging of capacitor 906 from voltages produced by fibres 300. Other harnessing circuits may be provided for other components in device 10. The energy recovery circuit may receive signals from one or more fibres 300 and may store the energy for an activation circuit for one or more fibres 300. In some circuits zener 916 may not be needed if lower power fibres are used.

In other embodiments aspects relating to the input module may be associated with other input devices for device 10.

It will be appreciated that the embodiments relating to devices, modules, applications and systems may be implemented in a combination of electronic hardware, firmware and software. The firmware and software may be implemented as a series of processes and/or modules that provide the functionalities described herein. Interrupt routines may be used. Data may be stored in volatile and non-volatile devices described herein and be updated by the hardware, firmware and/or software. Some of the processes may be distributed. As such, in particular, it will be appreciated that the features of input module 70 and its two component systems may be provided in separate modules or application in device 10.

As used herein, the wording "and/or" is intended to represent an inclusive-or. That is, "X and/or Y" is intended to mean X or Y or both.

The present disclosure is defined by the claims appended hereto, with the foregoing description being merely illustrative of a preferred embodiment of the present disclosure. Those of ordinary skill may envisage certain modifications to the foregoing embodiments which, although not explicitly discussed herein, do not depart from the scope of the disclosure, as defined by the appended claims.

The invention claimed is:

1. An electronic device comprising:
an input device comprising a piezoelectric element embedded in a substrate; and
wherein, when a force is detected on the input device, a feedback signal is provided to the input device.

2. The electronic device as claimed in claim 1, wherein the feedback signal causes the input device to vibrate when the force is detected on the input device.

3. The electronic device as claimed in claim 1, further comprising:
a display; and
a cover for the display, wherein the input device is embedded in a substrate above the display.

4. The electronic device as claimed in claim 3, wherein the piezoelectric element is a fibre.

5. The electronic device as claimed in claim 1, wherein the input device comprises a plurality of electrodes associated with the piezoelectric element.

6. The device as claimed in claim 5, wherein the input device is configured to analyze voltage signals detected by the plurality of electrodes and generated by the piezoelectric element to determine a location of the force on the input device.

7. The device as claimed in claim 5, wherein the plurality of electrodes are located in a first layer and the piezoelectric element is located in an adjacent second layer in the input device.

8. The electronic device as claimed in claim 1, wherein at least a first electrode is associated with a first region along the piezoelectric element and at least a second electrode is associated with a second region along the piezoelectric element.

9. The electronic device as claimed in claim 8, wherein the piezoelectric element vibrates the first region when the force is detected on the first region and to vibrates the second region when the force is detected on the second region.

10. The electronic device as claimed in claim 1, wherein the feedback signal is applied with a force of less than 2 Newtons.

11. The electronic device as claimed in claim 10, wherein the input device vibrates with a frequency of between 100 Hz and 300 Hz.

12. The electronic device as claimed in claim 1, further comprising a plurality of transistors and a pulse width modulator configured to drive the plurality of transistors to cause the piezoelectric element to vibrate.

13. The electronic device as claimed in claim 1, wherein a voltage is generated for an energy storage circuit from signals received from the input device.

14. The electronic device as claimed in claim 13, wherein the energy storage circuit includes a capacitor.

15. The electronic device as claimed in claim 13, further comprising a rectifier that rectifies the voltage for the energy storage circuit.

16. The electronic device as claimed in claim 1, wherein a pulse width modulator is configured to generate signals to cause generation of a first voltage signal and a second voltage signal.

17. The electronic device as claimed in claim 1, wherein the piezoelectric element operates as a sensor and operates as an actuator.

18. The electronic device as claimed in claim 1, wherein the input device is embedded in a substrate above a display, and wherein the piezoelectric element is arranged in a grid pattern.

19. The electronic device as claimed in claim 1, wherein the piezoelectric element is located between keys of a display.

20. The electronic device as claimed in claim 1, wherein the piezoelectric element is located in at least one ridge on a cover for a display.

21. The device as claimed in claim 1, wherein the input device comprises electrodes disposed around the piezoelectric element.

22. The device as claimed in claim 1, wherein the input device comprises electrodes comprising tines that are associated with and spaced from the piezoelectric element.

* * * * *